United States Patent
Kono et al.

(10) Patent No.: US 10,824,044 B2
(45) Date of Patent: Nov. 3, 2020

(54) MACH-ZEHNDER MODULATOR

(71) Applicant: SUMITOMO ELECTRIC INDUSTRIES, LTD., Osaka (JP)

(72) Inventors: Naoya Kono, Osaka (JP); Masataka Watanabe, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/451,697

(22) Filed: Jun. 25, 2019

(65) Prior Publication Data

US 2020/0004102 A1  Jan. 2, 2020

(30) Foreign Application Priority Data

Jun. 27, 2018  (JP) .................................. 2018-121839

(51) Int. Cl.
*G02F 1/225* (2006.01)
*G02F 1/01* (2006.01)
*G02F 1/21* (2006.01)

(52) U.S. Cl.
CPC ............. *G02F 1/225* (2013.01); *G02F 1/011* (2013.01); *G02F 2001/212* (2013.01); *G02F 2201/12* (2013.01)

(58) Field of Classification Search
CPC .... G02F 1/225; G02F 1/011; G02F 2001/212; G02F 2001/12
USPC .......................................................... 385/3
See application file for complete search history.

(56) References Cited

U.S. PATENT DOCUMENTS

| 4,950,058 A * | 8/1990 | Diem ................ G02F 1/133514 345/88 |
| 9,069,223 B2 | 6/2015 | Prosyk |
| 2014/0369637 A1* | 12/2014 | Hoffmann ............... G02F 1/225 385/3 |
| 2016/0026063 A1* | 1/2016 | Yagi ....................... G02F 1/2255 385/2 |
| 2016/0054639 A1* | 2/2016 | Kono .................... G02F 1/2255 385/2 |
| 2016/0349595 A1* | 12/2016 | Velthaus ............... G02F 1/2255 |

* cited by examiner

*Primary Examiner* — Jerry M Blevins
(74) *Attorney, Agent, or Firm* — Smith, Gambrell & Russell, LLP.

(57) ABSTRACT

A Mach-Zehnder modulator includes: first and second resistive elements each having first and second contact areas, the first and second contact areas of the first resistive element being arranged in a direction of a first axis, the first and second contact areas of the second resistive element being arranged in a direction of a second axis; a common conductor connecting the first contact areas of the first and second resistive elements with each other; first and second waveguide structures each including a waveguide portion extending in a direction of a third axis intersecting the first and second axes; a first signal conductor connected to the waveguide portion of the first waveguide structure and the second contact area of the first resistive element; and a second signal conductor connected to the waveguide portion of the second waveguide structure and the second contact area of the second resistive element.

9 Claims, 8 Drawing Sheets

MACH-ZEHNDER MODULATOR

BACKGROUND OF THE INVENTION

Field of the Invention

The present invention relates to a Mach-Zehnder modulator.

Related Background Art

U.S. Pat. No. 9,069,223, referred to as Patent Document 1, discloses a Mach-Zehnder modulator. This application claims the benefit of priority from Japanese Patent application No. 2018-121839, filed on Jun. 27, 2018, which is herein incorporated by reference in its entirety.

SUMMARY OF THE INVENTION

A Mach-Zehnder modulator according to an aspect of the embodiment includes: a first resistive element having a first contact area and a second contact area, the first contact area and the second contact area of the first resistive element being arranged in a direction of a first axis; a second resistive element having a first contact area and a second contact area, the first contact area and the second contact area of the second resistive element being arranged in a direction of a second axis; a common conductor making contact with the first contact area of the first resistive element and the first contact area of the second resistive element to connect the first resistive element and the second resistive element with each other; a first waveguide structure including a waveguide portion extending in a direction of a third axis intersecting the first axis and the second axis; a second waveguide structure including a waveguide portion extending in the direction of the third axis; a first signal conductor connected to the waveguide portion of the first waveguide structure and the second contact area of the first resistive element; and a second signal conductor connected to the waveguide portion of the second waveguide structure and the second contact area of the second resistive element.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

DESCRIPTION OF THE EMBODIMENTS

Figure 1:
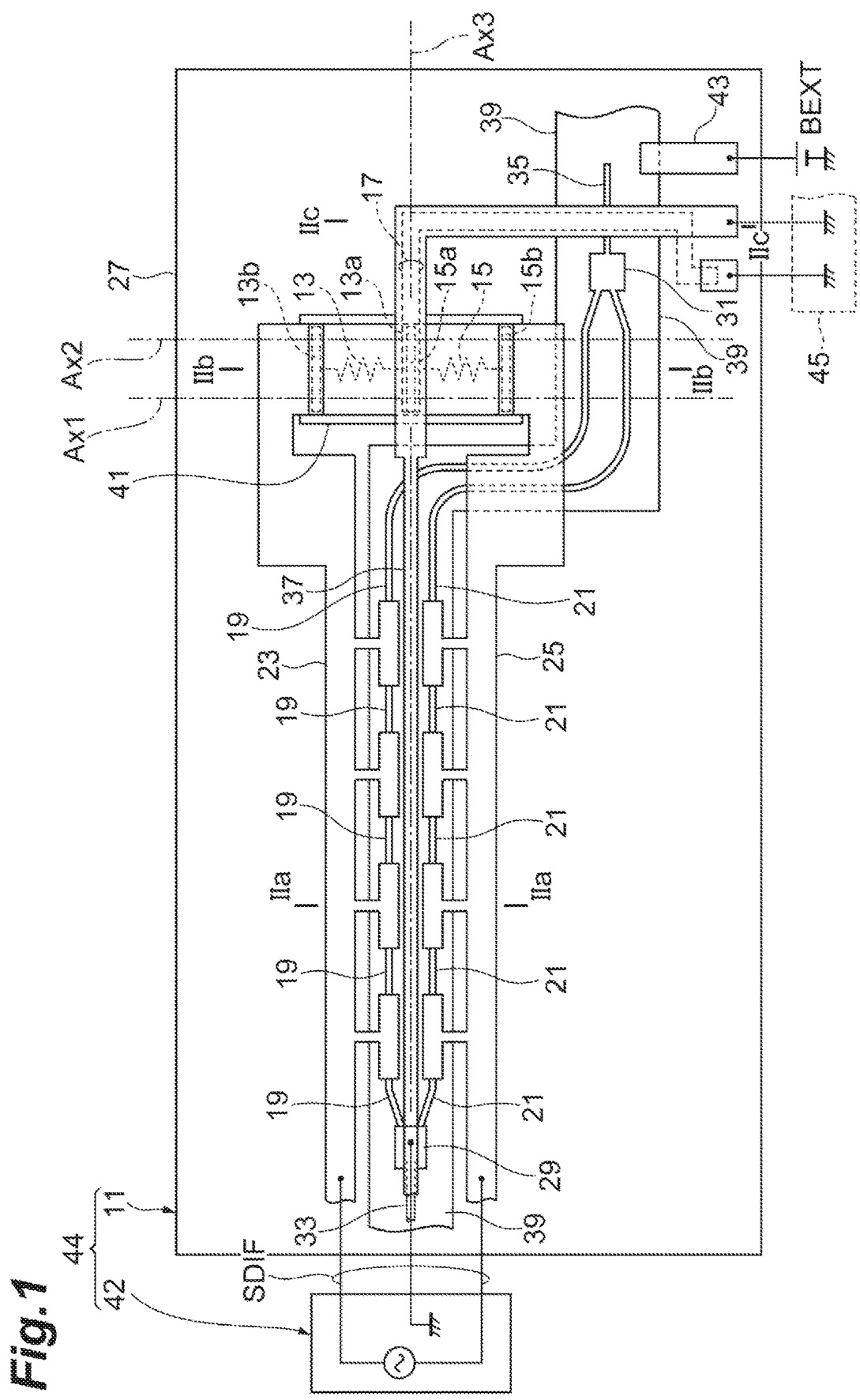
FIG. 1 is a schematic view showing a Mach-Zehnder modulator according to an example of the embodiment.

The Mach-Zehnder modulator in Patent Document 1 is designed to operate in response to a differential signal, which propagates on a pair of signal conductors in a semiconductor device. The semiconductor device receives the differential signal from an external driver circuit at the input electrode pads thereof. Specifically, the differential signal thus received is applied to a pair of arm waveguides of the Mach-Zehnder modulator through the pair of signal conductors. The pair of signal conductors, which comes from the input pad electrodes, runs to the output electrode pads, which are connected to respective external resistance elements in the terminator through bonding wires. This connection through the bonding wires produces parasitic inductance between the semiconductor device and the external resistance elements of the terminator. The incorporation of resistive elements of such a terminator into the semiconductor device removes bonding wires from the electrical connection between the signal conductors of the semiconductor device and the resistive elements of the terminator.

The inventors' teachings reveal that integrating the resistive elements with the semiconductor device may cause a new signal reflection in the semiconductor device.

What is needed is to provide a Mach-Zehnder modulator that can reduce the occurrence of signal reflection resulting from the integration of the resistive elements of a terminator with the Mach-Zehnder modulator.

A description will be given of examples according to the embodiment below.

A Mach-Zehnder modulator according to an example includes: (a) a first resistive element having a first contact area and a second contact area, the first contact area and the second contact area of the first resistive element being arranged in a direction of a first axis; (b) a second resistive element having a first contact area and a second contact area, the first contact area and the second contact area of the second resistive element being arranged in a direction of a second axis; (c) a common conductor making contact with the first contact area of the first resistive element and the first contact area of the second resistive element to connect the first resistive element and the second resistive element with each other; (d) a first waveguide structure including a waveguide portion extending in a direction of a third axis intersecting the first axis and the second axis; (e) a second waveguide structure including a waveguide portion extending in the direction of the third axis; (f) a first signal conductor connected to the waveguide portion of the first waveguide structure and the second contact area of the first resistive element; and (g) a second signal conductor connected to the waveguide portion of the second waveguide structure and the second contact area of the second resistive element.

The Mach-Zehnder modulator, which allows the first and second arm waveguide structures to receive a differential signal propagating on the first and second signal conductors, respectively, is integrated with the first and second resistive elements. The first and second resistive elements are connected to the first and second signal conductors and are oriented in the respective directions of the first and second axes which intersect the third axis. The orientation of the first resistive element allows the first component of the differential signal on the first signal conductor to propagate through the first and second contact areas, which are arranged in the direction of the first axis, of the first resistive element, and the orientation of the second resistive element allows the second component of the differential signal on the second signal conductor to propagate through the first and second contact areas, which are arranged in the direction of the second axis, of the second resistive element. The first and second resistive elements thus orientated can terminate the differential-mode components of the differential signal to bring the common conductor a remaining component, which mainly contains the common mode.

The Mach-Zehnder modulator according to an example of the embodiment further includes a reference potential conductor extending along at least one of the first signal conductor and the second signal conductor.

The Mach-Zehnder modulator allows the reference potential conductor to provide the first and second signal conductors with a ground plane.

The Mach-Zehnder modulator according to an example of the embodiment further includes; a semiconductor stage mounting the first resistive element and the second resistive element; and an embedding region embedding the first waveguide structure and the second waveguide structure, the first resistive element and the second resistive element being disposed in the embedding region.

The Mach-Zehnder modulator provides the first and second resistive elements with the semiconductor stage enabling heat dissipation to the substrate. The semiconductor stage can separate the first and second resistive elements away from a conductive semiconductor layer to prevent the close electrical coupling between the conductive semiconductor layer and the first and second resistive elements.

The Mach-Zehnder modulator according to an example of the embodiment further includes a conductive semiconductor layer connecting the first waveguide structure and the second waveguide structure with each other.

The Mach-Zehnder modulator provides the first and second arm waveguide structures with the common conductive semiconductor layer shared by these waveguide structures.

Teachings of the present invention can be readily understood by considering the following detailed description with reference to the accompanying drawings shown as examples. Referring to the accompanying drawings, a Mach-Zehnder modulator, and a method for fabricating a Mach-Zehnder modulator according to examples of the present embodiment will be described below. To facilitate understanding, identical reference numerals are used, where possible, to designate identical elements that are common to the figures.

Figure 2A:
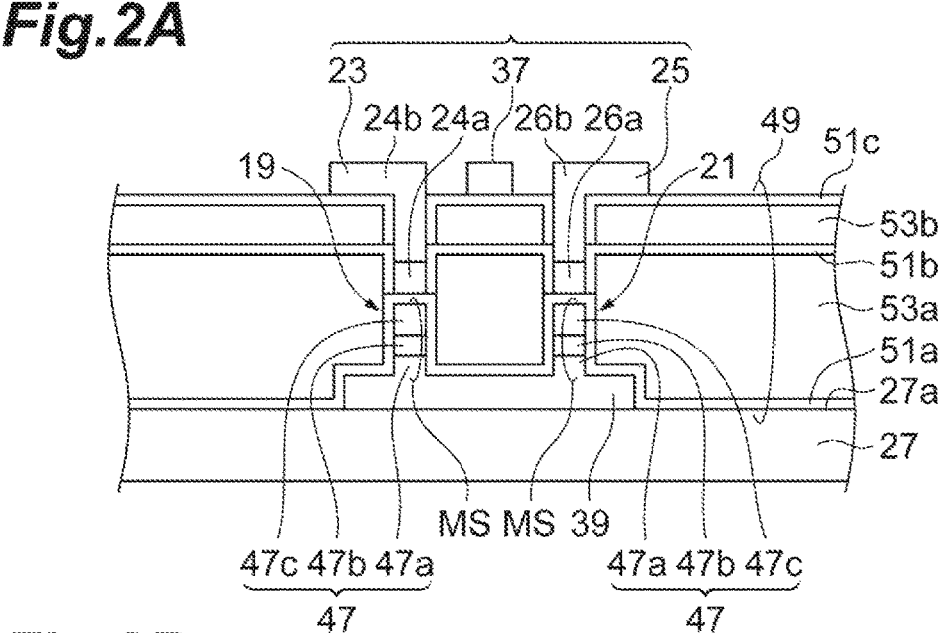
FIG. 2A is a cross sectional view, taken along line IIa-IIa shown in FIG. 1, showing the Mach-Zehnder modulator according to the example of the embodiment.
Figure 2B:
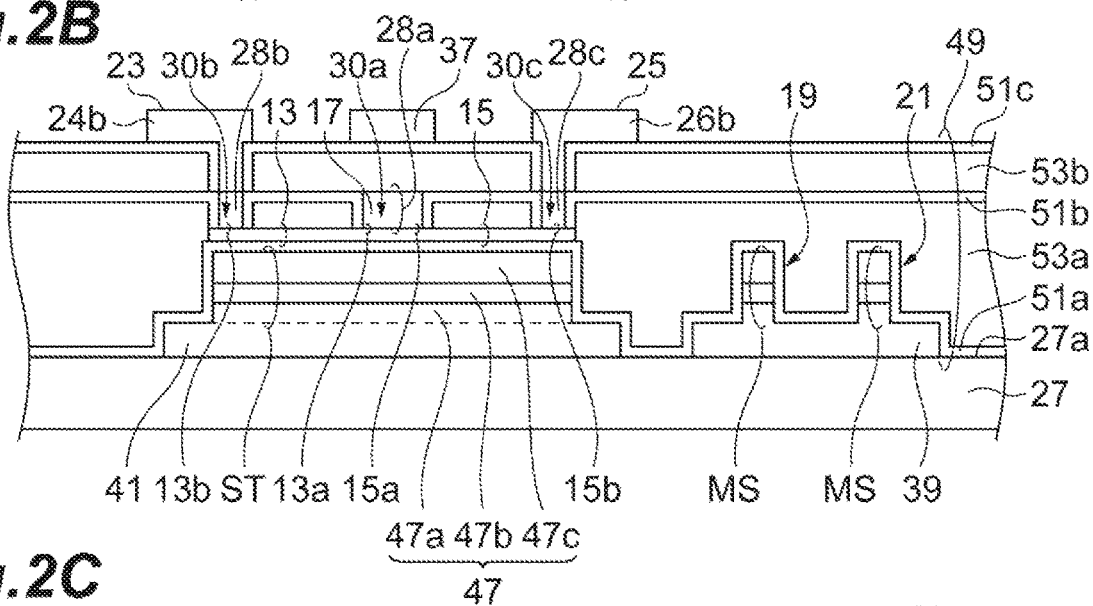
FIG. 2B is a cross sectional view, taken along line IIb-IIb shown in FIG. 1, showing the Mach-Zehnder modulator according to the example of the embodiment.
Figure 2C:
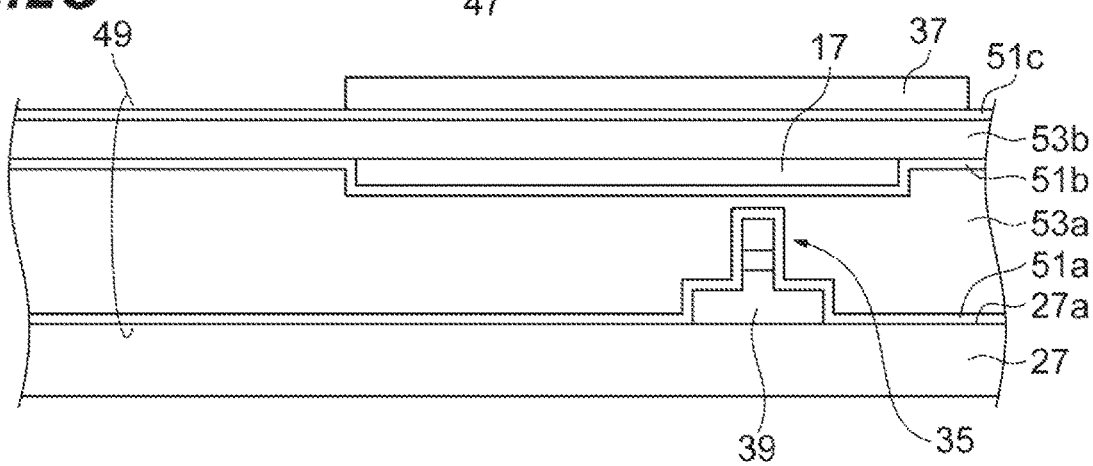
FIG. 2C is a cross sectional view, taken along line IIc-IIc shown in FIG. 1, showing the Mach-Zehnder modulator according to the example of the embodiment.

FIG. 1 is a schematic view showing a Mach-Zehnder modulator according to an example of the present embodiment. FIG. 2A is a cross sectional view, taken along line IIa-IIa in FIG. 1, showing the Mach-Zehnder modulator according to the example of the embodiment. FIG. 2B is a cross sectional view, taken along line IIb-IIb in FIG. 1, showing the Mach-Zehnder modulator according to the example of the embodiment. FIG. 2C is a cross sectional view, taken along line IIc-IIc in FIG. 1, showing the Mach-Zehnder modulator according to the example of the embodiment.

The Mach-Zehnder modulator 11 includes a first resistive element 13, a second resistive element 15, a common conductor 17, a first arm waveguide structure 19, a second arm waveguide structure 21, a first signal conductor 23, and a second signal conductor 25. The first resistive element 13 has a first contact area 13a and a second contact area 13b and is disposed on the semiconductor substrate 27. The first and second contact areas 13a and 13b are arranged in the direction of a first axis Ax1. The second resistance element 15 has a first contact area 15a and a second contact area 15b and is disposed on the semiconductor substrate 27. The first and second contact areas 15a and 15b are arranged in the direction of a second axis Ax2. The common conductor 17 is disposed on the semiconductor substrate 27, and makes contact with both the first contact area 13a of the first resistance element 13 and the first contact area 15a of the second resistance element 15 to connect the first resistive elements 13 and 15 with each other. The first arm waveguide structure 19 includes a waveguide portion extending in the direction of a third axis Ax3 that intersects the first and second axes Ax1 and Ax2. The second arm waveguide structure 21 includes a waveguide portion extending in the direction of the third axis Ax3. The first signal conductor 23 makes contact with the second contact area 13b of the first resistive element 13 and connects the waveguide portion of the first arm waveguide structure 19 with the first resistive element 13. The second signal conductor 25 makes contact with the second contact area 15b of the second resistive element 15 and connects the waveguide portion of the second arm waveguide structure 21 with the second resistive element 15.

The Mach-Zehnder modulator 11, which allows the first and second arm waveguide structures 19 and 21 to receive respective components of a differential signal SDIF on the first and second signal conductors 23 and 25, is incorporated with the first and second resistive elements 13 and 15. The first and second resistive elements 13 and 15 are connected to the first and second signal conductors 23 and 25 at the second contact areas 13b and 15b, respectively, and extend from the second contact areas 13b and 15b in the respective directions of the first and second axes Ax1 and Ax2, which intersect the third axis Ax3. Specifically, the first resistive element 13 receives the first signal component S1 of the differential signal SDIF from the first signal conductor 23 at the second contact area 13b, and the first signal component S1 thus received propagates from the second contact area 13b to the first contact area 13a to reach the common conductor 17, and the first and second contact areas 13a and 13b are disposed on the first axis Ax1 to define the flow direction of the first signal component S1. The second resistive element 15 receives the second signal component S2 of the differential signal SDIF from the second signal conductor 25 at the second contact area 15b, and the second signal component S2 thus received propagates from the second contact area 15b to the first contact area 15a to reach the common conductor 17, and the first and second contact areas 15a and 15b are disposed on the second axis Ax2 to define the flow direction of the second signal component S2. The arrangement of the first and second resistive elements 13 and 15 results in that the first and second signal components S1 and S2 propagate in opposite directions to reach the common conductor 17. The propagations in the opposite directions enable the termination of differential mode to produce the remaining component on the common conductor 17, and the remaining component mainly contains common mode.

Referring to FIG. 1, an optical transmitter 44 includes the Mach-Zehnder modulator 11 and a driver 42. The Mach-Zehnder modulator 11 includes a divider 29 and a merger 31. The divider 29 is connected to an input waveguide 33 at the input port thereof and is connected to each of the first and second arm waveguide structures 19 and 21 at the output ports thereof. The merger 31 is connected to an output waveguide 35 at the output port thereof and to both of the first and second arm waveguide structures 19 and 21 at the input ports thereof. The divider 29, the first arm waveguide structure 19, the second arm waveguide structure 21, and the merger 31 are disposed on a principal face 27a of the semiconductor substrate 27 of the Mach-Zehnder modulator 11.

The first and second signal conductors 23 and 25 are connected to a top face of the first arm waveguide structure 19 and a top face of the second arm waveguide structure 21, respectively.

The Mach-Zehnder modulator 11 further includes a conductive semiconductor layer 39. The conductive semiconductor layer 39 mounts the first arm waveguide structure 19, the second arm waveguide structure 21, the divider 29 and the merger 31, and connects the bottoms of the first and second arm waveguide structures 21 and 23 with each other. The conductive semiconductor layer 39 is disposed on the principal face 27a of the semiconductor substrate 27 of the Mach-Zehnder modulator 11. In the present example, the conductive semiconductor layer 39 may be connected to a metal conductor 43 to receive a bias voltage from an external bias source BEXT.

The Mach-Zehnder modulator 11 further includes at least one reference potential conductor 37. The reference potential conductor 37 may extend along at least one of the first and second signal conductors 23 and 25. In the present example, the single reference potential conductor 37, which is disposed between the waveguide portion of the first arm waveguide structure 19 and the waveguide portion of the second arm waveguide structure 21, extends along both the first and second signal conductors 23 and 25. The reference potential conductor 37 produces a ground plane in the differential signal line of the Mach-Zehnder modulator 11. The differential signal line is provided with the first and second signal conductors 23 and 25 and the reference potential conductor 37.

The first signal conductor 23, the reference potential conductor 37 and the second signal conductor 25 are connected to the driver 42 at their respective input ends. The first and second signal conductors 23 and 25 terminate at their respective other ends, which are opposite to the input end. Specifically, the first and second signal conductors 23 and 25 extend in the direction of the third axis Ax3 so as to be periodically connected with the first and second arm waveguide structures 19 and 21, respectively, and then reach the first and second resistive elements 13 and 15, which are integrated with the Mach-Zehnder modulator 11, respectively.

Referring to FIG. 2A, each of the first and second arm waveguide structures 19 and 21 includes a semiconductor mesa MS, which is disposed on the conductive semiconductor layer 39. The semiconductor mesa MS includes a semiconductor laminate 47. Specifically, the semiconductor laminate 47 includes a first conductivity type semiconductor region 47a, a core layer 47b, and a second conductivity type semiconductor region 47c. The first conductivity type semiconductor region 47a, the core layer 47b, and the second conductivity type semiconductor region 47c are arranged in the direction of the axis that intersects the principal face 27a of the semiconductor substrate 27. The first signal conductor 23 may include a first lower metal layer 24a and a first upper metal layer 24b, and the second signal conductor 25 may include a second lower metal layer 26a and a second upper metal layer 26b. The first and second lower metal layers 24a and 26a are in contact with the second conductivity type semiconductor region 47c of the first arm waveguide structure 19 and the second conductivity type semiconductor region 47c of the second arm waveguide structure 21, respectively.

The Mach-Zehnder modulator 11 includes an embedding region 49, which embeds the first and second arm waveguide structures 19 and 21. In the present embodiment, the embedding region 49 includes a first inorganic insulating film 51a, a second inorganic insulating film 51b, a third inorganic insulating film 51c, a first embedding resin body 53a, and a second embedded resin body 53b. The first inorganic insulating film 51a covers the principal face 27a of the semiconductor substrate 27, the conductive semiconductor layer 39, the first arm waveguide structure 19, and the second arm waveguide structure 21. The first embedding resin body 53a covers the first inorganic insulating film 51a, the first arm waveguide structure 19, and the second arm waveguide structure 21. The second inorganic insulating film 51b covers the first embedding resin body 53a. The second embedding resin body 53b covers the second inorganic insulating film 51b. The third inorganic insulating film 51c covers the second embedding resin body 53b. The first signal conductor 23, the second signal conductor 25, and the reference potential conductor 37 are disposed on the third inorganic insulating film 51c. The first and second lower metal layers 24a and 26a are disposed in the respective openings of the second inorganic insulating film 51b and the first embedding resin body 53a, and the first upper metal layer 24b and the second upper metal layer 26b are connected through the openings of the third inorganic insulating film 51c and the second embedding resin body 53b with the first and second lower metal layers 24a and 26a.

Referring to FIG. 2B, the Mach-Zehnder modulator 11 further includes a semiconductor stage ST. In the present embodiment, the semiconductor stage ST mounts the first and second resistance elements 13 and 15. The Mach-Zehnder modulator 11 provides the first and second resistance elements 13 and 15, which are disposed on semiconductor stage ST, with a heat radiation path to the semiconductor substrate 27 via the semiconductor stage ST.

The Mach-Zehnder modulator 11 may include another conductive semiconductor layer 41, which mounts the semiconductor stage ST. The other conductive semiconductor layer 41 is separated away from the conductive semiconductor layer 39. This separation can prevent the first and second resistance elements 13 and 15, which are mounted on the semiconductor stage ST, from being electrically coupled to the conductive semiconductor layer 39.

In the present embodiment, the first and second resistance elements 13 and 15 are disposed in the embedding region 49. Specifically, the first resistance element 13 and the second resistance element 15 are provided on the first inorganic insulating film 51a, and the first inorganic insulating film 51a covers the semiconductor stage ST. The first resistive element 13, the second resistive element 15, and the first inorganic insulating film 51a are embedded with the first embedding resin body 53a. The second inorganic insulating film 51b is disposed on the first resistive element 13, the second resistive element 15, and the first embedding resin body 53a to cover them.

The common conductor 17 includes a third lower metal layer 28a and the third lower metal layer 28a is disposed in the opening 30a of the second inorganic insulating film 51b and the first embedding resin body 53a to make contact with the first contact areas 13a and 15a of the first and second resistive elements 13 and 15.

The first and second signal conductors 23 and 25 include a fourth lower metal layer 28b and a fifth lower metal layer 28c, respectively, and the fourth and fifth lower metal layers 28b and 28c are disposed in the openings 30b and 30c of the second inorganic insulating film 51b and the first embedding resin body 53a, respectively. Specifically, the fourth and fifth lower metal layers 28b and 28c make contact with the second contact area 13b of the first resistive element 13 and the second contact area 15b of the second resistive element 15.

In the Mach-Zehnder modulator 11 according to the present embodiment, the reference potential conductor 37 is disposed on the embedding region 49 to pass over the first and second resistive elements 13 and 15 and the common conductor 17, which the embedding region 49 separates from the reference potential conductor 37. The first and second resistance elements 13 and 15 are designed to have the substantially same resistance value, which can be, for example, in the range of 25 to 50 ohms, with the substantially same size. The Mach-Zehnder modulator 11 is provided with a virtual ground plane, which has zero amplitude, on the area that is between the second contact areas 13b and 15b of the first and second resistance elements 13 and 15.

Referring to FIG. 1, the Mach-Zehnder modulator 11 according to the present embodiment orients the first and second resistance elements 13 and 15 in the respective directions opposite to each other, and specifically the first and second resistive elements 13 and 15 are arranged along the directions of the first and second axes Ax1 and Ax2, respectively. This arrangement of the first and second resistive elements 13 and 15 can reduce reflection of differential mode in the Mach-Zehnder modulator 11.

In the Mach-Zehnder modulator 11 according to the present embodiment, the second contact area 13b of the first resistive element 13 may be distanced from the second contact area 15b of the second resistive element 15 by 200 micrometers or less. A distance in this range can provide the Mach-Zehnder modulator 11 with the reduction in the reflection of common mode in the metal body that connects the first contact area 13a of the first resistive element 13 with the first contact area 15a of the second resistive element 15. Specifically, the first and second resistive elements 13 and 15 are oriented such that the respective electrical signals from the first and second signal conductors 23 and 25 propagate in the opposite directions in the first and second resistive elements 13 and 15. In order to enable this arrangement (the orientation of the first and second resistive elements 13 and 15), the first signal conductor 23 can be bent in the vicinity of the second contact area 13b of the first resistive element 13, and the second signal conductor 25 can also be bent in the vicinity of the second contact area 15b of the second resistive element 15.

The semiconductor stage ST can be provided with a semiconductor laminate 47, which has a structure similar to that of the first and second arm waveguide structures 19 and 21.

Referring to FIG. 2C, the reference potential conductor 37 extends on the top face of the embedding region 49 while the common conductor 17 extends within the embedding region 49. If necessary, in order to allow a part of the common conductor 17 to extend on the embedding region 49, the common conductor 17 may use both the lower and upper metal layers to be changed from the lower metal layer to the upper metal layer and vice versa. In the present embodiment, the common conductor 17 and the reference potential conductor 37 are arranged in the direction of the axis normal to the principal face 27a of the semiconductor substrate 27 to provide an overhead or underground crossing. The embedding region 49, specifically, the third inorganic insulating film 51c and the second embedding resin body 53b can separate the reference potential conductor 37 away from the common conductor 17. The Mach-Zehnder modulator 11 allows the common conductor 17 to extend below and along the reference potential conductor 37 and be disposed in the embedding region 49, thereby matching a transmission line relating to the common conductor 17 with a common mode impedance. In the present embodiment, the common conductor 17 and the reference potential conductor 37 run in parallel to a common mode terminator 45 to be grounded thereat. If possible, the reference potential conductor 37 may run within the embedding region 49 such that the common conductor 17 can be disposed on the embedding region 49 and the reference potential conductor 37, thereby forming a transmission line relating to the common conductor 17.

This transmission line is effective in reducing the reflection of common mode in the Mach-Zehnder modulator 11 that includes the common conductor 17, which connects the other end of the first resistance element 13 to the other end of the second resistance element 15, with a length exceeding 300 micrometers.

EXAMPLE

An exemplary Mach-Zehnder modulator 11 according to the present embodiment

First resistive element 13: NiCr, NiCrSi, CuNi, or TaN, with a thickness of 50 nm and dimensions of 50×50 micrometers Second resistive element 15: NiCr, NiCrSi, CuNi, or TaN, with a thickness of 50 nm and dimensions of 50×50 micrometers Semiconductor laminate 47 for the first and second arm waveguide structures First conductivity type semiconductor region 47a: InP of n-type, with a thickness of 0.5 micrometers Core layer 47b: AlGaInAs-based multiple quantum well, with a thickness of 0.5 micrometer Second conductivity type semiconductor region 47c: InP of p-type, with a thickness of 0.5 micrometers Conductive semiconductor layer 39: InP of n-type, with a thickness of 1 micrometer First and second embedding resin bodies 53a and 53b: benzocyclobutene (BCB)

First inorganic insulating film 51a: silicon oxide, with a thickness of 100 nm

Second inorganic insulating film 51b: silicon oxide, with a thickness of 200 nm

Third inorganic insulating film 51c: silicon oxide, with a thickness of 200 nm

Common conductor 17; gold, with a thickness of 2 micrometers

Figure 3:
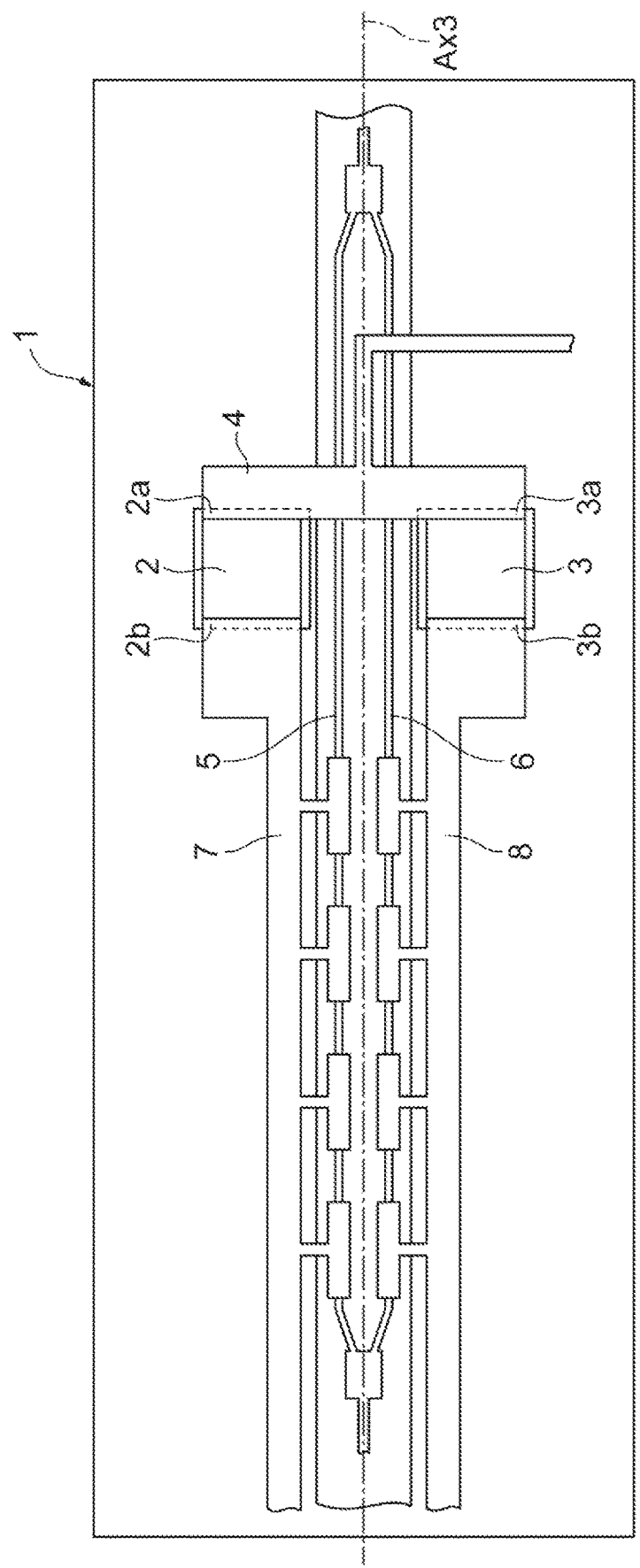
FIG. 3 is a schematic view showing a Mach-Zehnder modulator including a first resistance element and a second resistance element that are arranged in a direction different from the arrangement of the first and second resistive elements of the Mach-Zehnder modulator according to the example of the embodiment.

First and second signal conductors 23 and 25: gold, with a thickness of 5 micrometers and a width of 100 micrometers Reference potential conductor 37: gold, with a thickness of 5 micrometers and a width of 10 micrometers FIG. 3 is a schematic view showing a Mach-Zehnder modulator 1 which includes first and second resistance elements 2 and 3. The first and second resistance elements 2 and 3 are arranged in a manner different from the arrangement of the first and second resistive elements 13 and 15 in the Mach-Zehnder modulator according to the present embodiment.

The Mach-Zehnder modulator 1 is provided with a connecting conductor 4, a first arm waveguide structure 5, a second arm waveguide structure 6, a first signal conductor 7, and a second signal conductor 8 in addition to the first and second resistance elements 2 and 3. The first arm waveguide structure 5 has a waveguide portion extending in the direction of the third axis Ax3. The second arm waveguide structure 6 has a waveguide portion extending in the direction of the third axis Ax3. The connecting conductor 4 makes contact with the first contact area 2a of the first resistance element 2 and the first contact area 3a of the second resistance element 3. The first signal conductor 7 is connected to the waveguide portion of the first arm waveguide structure 5 and makes contact with the second contact area 2b of the first resistance element 2. The second signal conductor 8 is connected to the waveguide portion of the second arm waveguide structure 6 and makes contact with the second contact area 3b of the second resistance element 3. The first and second resistance elements 2 and 3 extend in the direction of the third axis Ax3.

The characteristics of the EO response and reflection in the differential mode are calculated with a simulation model. The simulation model of the Mach-Zehnder modulator 1 is the same as that of the Mach-Zehnder modulator 11 except for the arrangement of the first and second resistance elements 2 and 3 and the arrangement of the reference potential conductor and the first and second signal conductors.

Figure 4A:
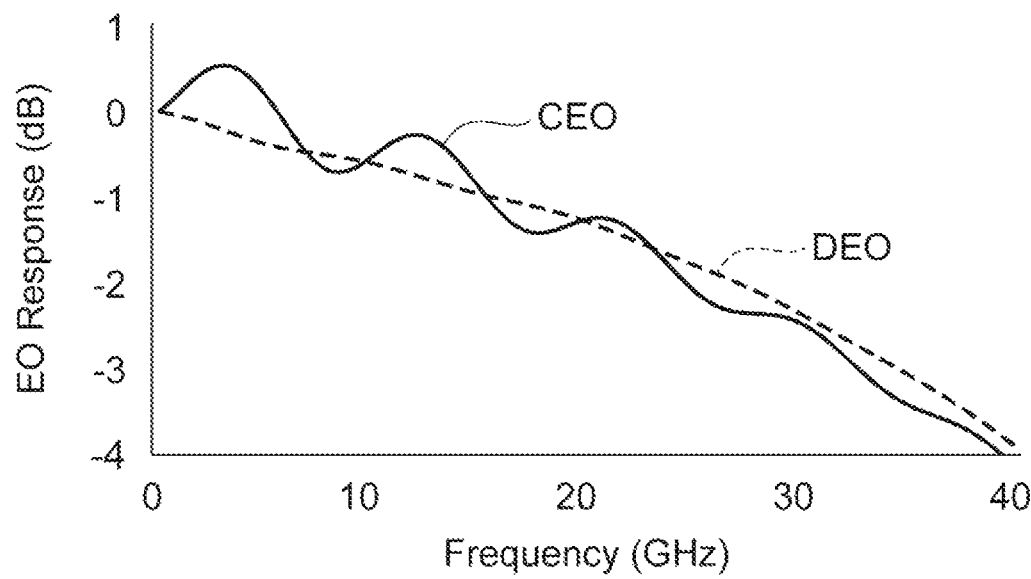
FIG. 4A is a graph showing a simulated EO response.
Figure 4B:
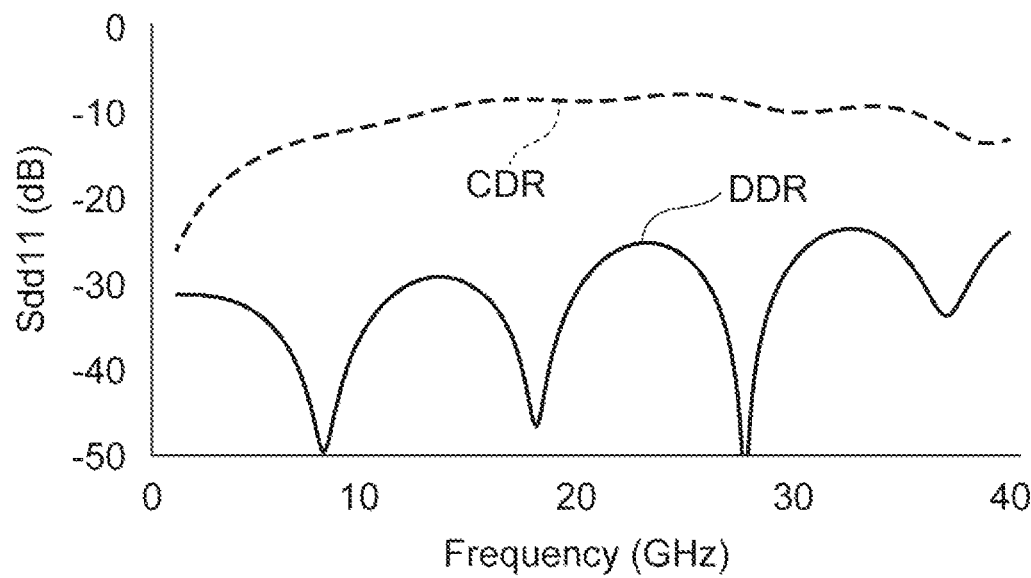
FIG. 4B is a graph showing a simulated reflection characteristics of differential mode.

FIG. 4A is a graph showing a simulated EO response, and FIG. 4B is a graph showing a simulated reflection in differential mode. Comparison of the EO response CEO of the Mach-Zehnder modulator 1 with the EO response DEO of the Mach-Zehnder modulator 11 reveals that the EO response CEO of the Mach-Zehnder modulator 1 exhibits a fluctuation larger than that of the Mach-Zehnder modulator 11 in modulation frequencies up to 40 GHz. The reflection characteristics DDR of the Mach-Zehnder modulator 11 in differential mode is smaller than the reflection characteristics CDR of the Mach-Zehnder modulator 1 in modulation frequencies up to 40 GHz.

Figure 5A:
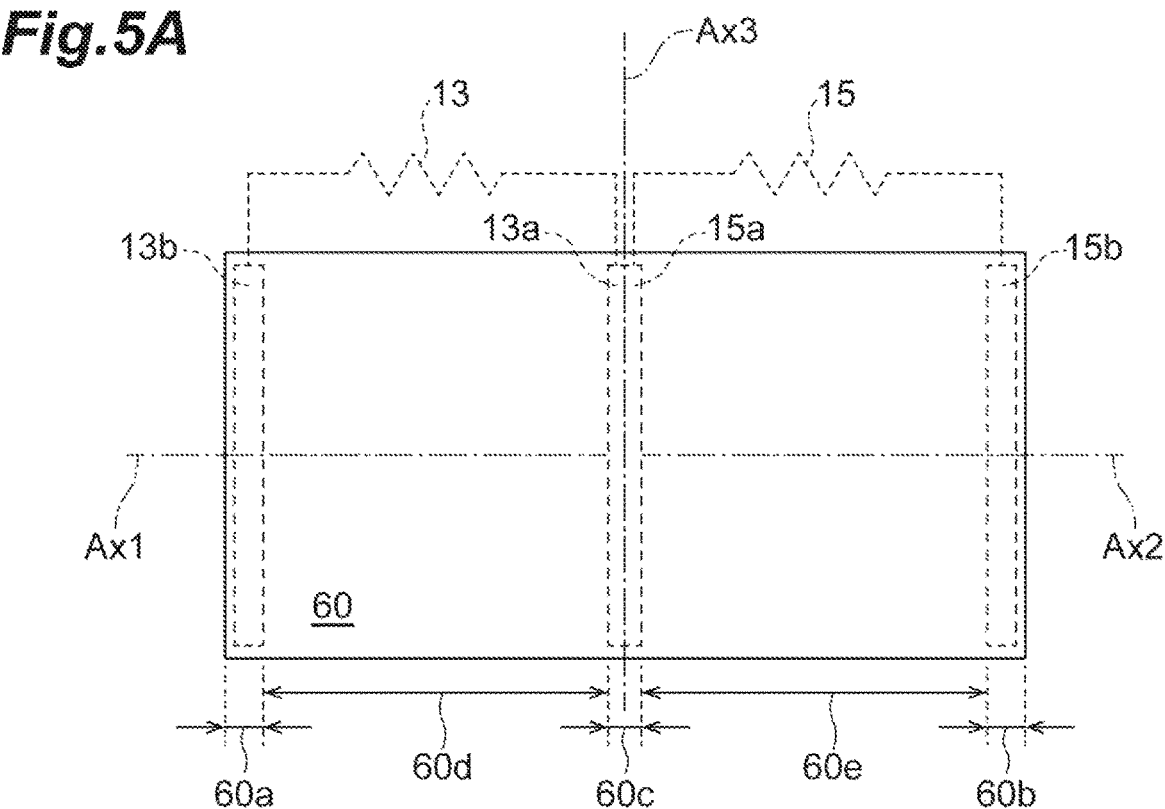
FIG. 5A is a plan view showing the shape of a resistive layer for the first and second resistive elements.
Figure 5B:
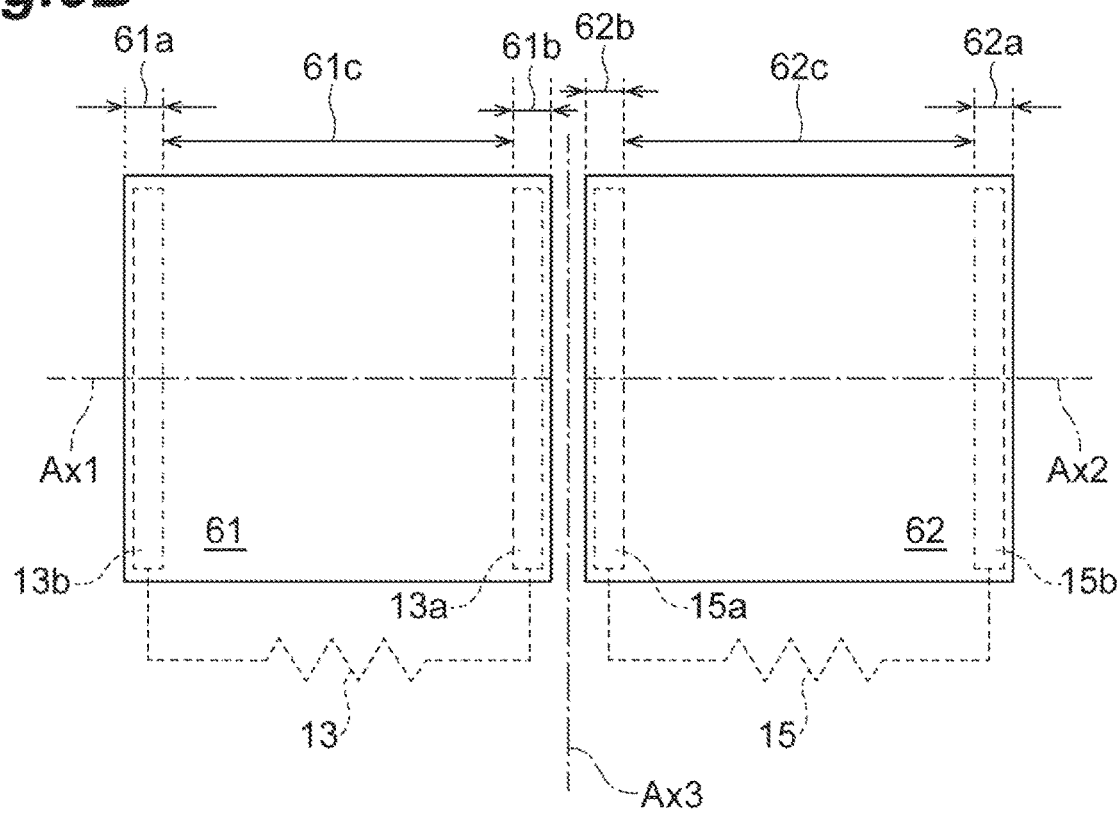
FIG. 5B is a plan view showing the shape of a resistive layer for the first and second resistive elements.

FIGS. 5A and 5B are plan views showing the shapes of a resistive layer applicable to the first and second resistive elements.

Referring to FIG. 5A, the first and second resistive elements 13 and 15 are made of a resistive layer 60. In the present example, the resistive layer 60 includes a first portion 60a, a second portion 60b, a third portion 60c, a fourth portion 60d, and a fifth portion 60e. Specifically, the first portion 60a is connected to the first signal conductor 23; the second portion 60b is connected to the second signal conductor 25; the third portion 60c is connected to the common conductor 17; the fourth portion 60d is disposed between the first portion 60a and the third portion 60c; and the fifth portion 60e is disposed between the second portion 60b and the third portion 60c. The first portion 60a, the fourth portion 60d and the third portion 60c of the resistive layer 60 are arranged to form the first resistive element 13, and the second portion 60b, the fifth portion 60e and the third portion 60c of the resistive layer 60 are arranged to form the second resistive element 15. In the resistive layer 60, the first portion 60a and the third portion 60c can be provided with the second contact area 13b and the first contact area 13a, respectively. In the resistive layer 60, the second portion 60b and the third portion 60c can be provided with the second contact area 15b and the first contact area 15a, respectively.

Specifically, the first portion 60a, the fourth portion 60d and the third portion 60c of the resistive layer 60 are arranged in the direction of the first axis Ax1, and the second portion 60b, the fifth portion 60e and the fifth portion of the resistive layer 60 are arranged in the direction of the second axis Ax2.

The resistive layer 60 is designed such that the first, fourth and third portions 60a, 60d and 60c of the resistive layer 60 and the second, fifth and third portions 60b, 60e and 60c of the resistive layer 60 are symmetrically arranged about the third axis Ax3.

The Mach-Zehnder modulator 11 may provide the single-connected resistive layer 60 with both the first and second resistive elements 13 and 15. The single-connected resistive layer 60 is provided with the first portion 60a, the second portion 60b and the third portion 60c therebetween to reduce differential-mode reflection.

In the present embodiment, the first portion 60a, the fourth portion 60d, the third portion 60c, the fifth portion 60e, and the second portion 60b of the resistive layer 60 may be arranged in a row.

Referring to FIG. 5B, the first and second resistive elements 13 and 15 are provided with the first and second resistive layers 61 and 62, respectively. Specifically, the first resistive layer 61 includes a first portion 61a, a second portion 61b, and a third portion 61c. The first and second portions 61a and 61b are connected to the first signal conductor 23 and the common conductor 17, respectively, and the third portion 61c is disposed between the first and second portions 61a and 61b. The second resistive layer 62 includes a first portion 62a, a second portion 62b, and a third portion 62c. The first and second portions 62a and 62b are connected to the second signal conductor 25 and the common conductor 17, respectively, and the third portion 62c is disposed between the first and second portions 62a and 62b.

The first, third and second portions 61a, 61c and 61b of the first resistive layer 61 are sequentially arranged to form the first resistive element 13. The first resistive layer 61 provides the first and second portions 61a and 61b with the second and first contact areas 13b and 13a, respectively. The first, third and second portions 62a, 62c and 62b of the second resistive layer 62 are sequentially arranged to form the second resistive element 15. The second resistive layer 62 provides the first and second portions 62a and 62b with the second and first contact areas 15b and 15a, respectively.

Specifically, the first, third and second portions 61a, 61c and 61b are arranged in the direction of the first axis Ax1 to form the first resistive layer 61, and the first, third and second portions 62a, 62c and 62b are arranged in the direction of the second axis Ax2 to form the second resistive layer 62.

The first and second resistive layers 61 and 62 are designed such that the first, third and second portions 61a, 61c and 61b and the first, third and second portions 62a, 62c and 62b are symmetrically arranged about the third axis Ax3, so that the first and second resistive layers 61 and 62 are also symmetrically arranged about the third axis Ax3.

The connection of resistive layers patterned to be separate from each other, specifically, the first and second resistive layers 61 and 62, to the common conductor 17 can make the reflection of the differential mode reduced.

In the present embodiment, the first and second resistive layers 61 and 62, specifically, the first, third and second portions 61a, 61c and 61b and the second, third and first portions 62b, 62c and 62a, are arranged in a row.

FIGS. 6A, 6B and 6C, FIGS. 7A, 7B and 7C, and FIGS. 8A, 8B and 8C are schematic views each showing a major step in a method for fabricating a Mach-Zehnder modulator according to the present embodiment. A description will be given of the fabricating method according to the embodiment with reference to FIGS. 6A to 8C.

Figure 6A:
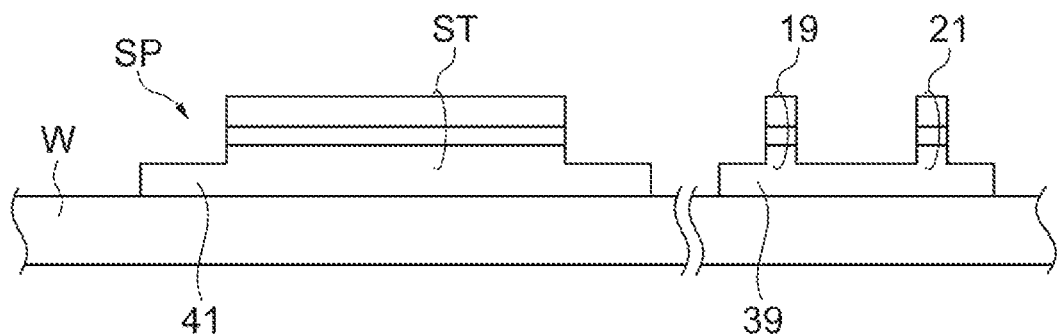
FIG. 6A is a schematic view showing a major step in a method for producing a Mach-Zehnder modulator according to an example of the embodiment.

Referring to FIG. 6A, the method includes a step for preparing a semiconductor product SP. The semiconductor product SP is provided with a first arm waveguide structure 19, a second arm waveguide structure 21, a semiconductor stage ST, and conductive semiconductor layers 39 and 41. The first and second arm waveguide structures 19 and 21, the semiconductor stage ST, and the conductive semiconductor layers 39 and 41 are disposed on a wafer W.

The semiconductor product SP can be produced as follows. A semiconductor laminate region for the optical waveguide is grown on the wafer W by a growing method, such as MOCVD. The semiconductor laminate region is formed by growing films for the conductive semiconductor layers 39 and 41, the first conductivity type semiconductor region 47a, the core layer 47b, and the second conductivity type semiconductor region 47c on the wafer W to prepare an epi substrate. The application of photolithography to the epi substrate can form a mask which has a pattern defining the shapes of the semiconductor stage and the waveguide structure. The mask is used to etch the epi substrate, thereby fabricating the semiconductor product SP.

Figure 6B:
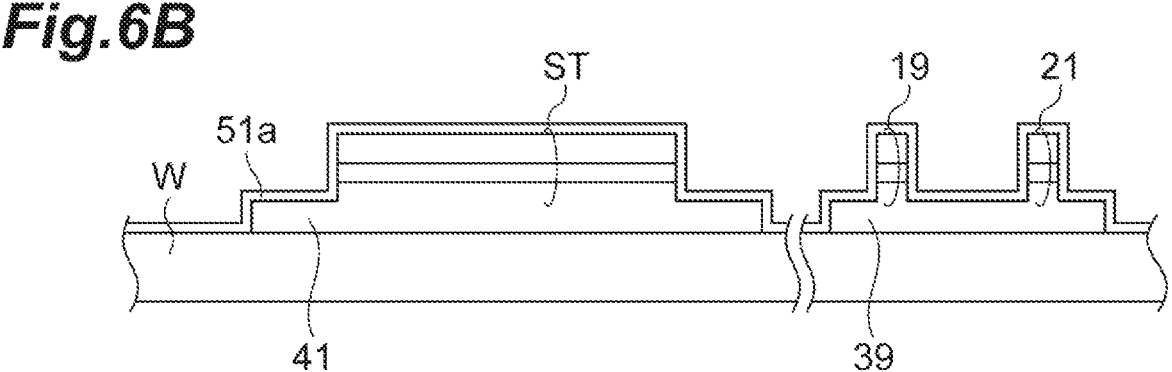
FIG. 6B is a schematic view showing a major step in the method according to the example of the embodiment.

Referring to FIG. 6B, the method includes a step for forming an inorganic insulating film on the semiconductor product SP. Specifically, the first inorganic insulating film 51a is formed thereon. The first inorganic insulating film 51a can include, for example, a silicon-based inorganic insulator, and is grown by, for example, a chemical vapor deposition.

Figure 6C:
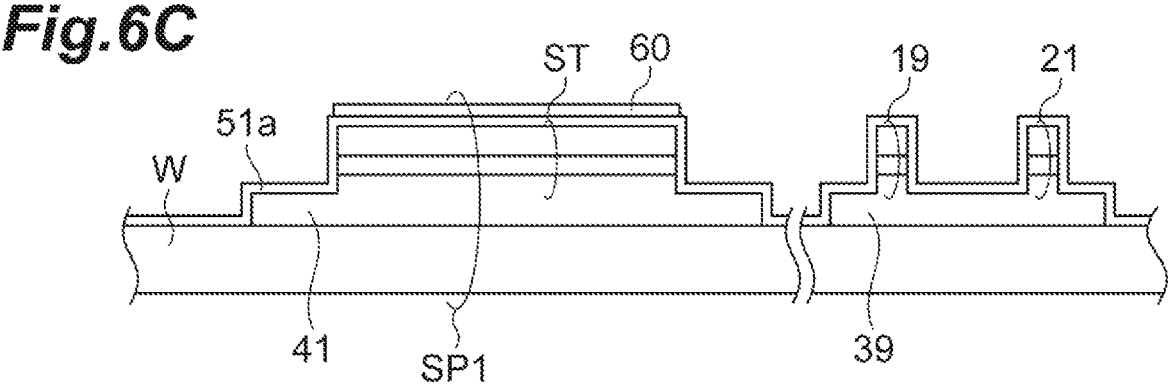
FIG. 6C is a schematic view showing a major step in the method according to the example of the embodiment.

Referring to FIG. 6C, the method includes a step for forming a resistive layer 60 on the semiconductor stage ST. The application of deposition and patterning to the semiconductor product SP forms the resistive layer 60 to obtain a first substrate product SP1. The resistive layer 60 includes a thin film made of resistance material, such as NiCr, NiCrSi, CuNi, or TaN. The resistive layer 60 is formed by, for example, sputtering and lift-off.

Figure 7A:
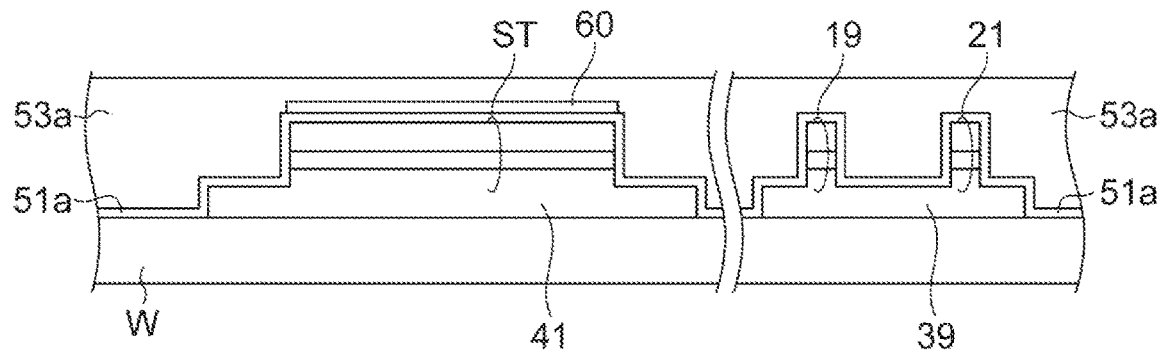
FIG. 7A is a schematic view showing a major step in the method according to the example of the embodiment.

Referring to FIG. 7A, the method includes a step for forming a resin body for the first embedding resin body 53a in the first substrate product SP1. Specifically, in order to form the first embedding resin body 53a, BCB resin is applied to the wafer W. The BCB resin thus applied is cured to form a cured resin body, which is hereinafter referred to as the resin body for the first embedding resin body 53a. The resin body for the first embedding resin body 53a embeds the first and second arm waveguide structures 19 and 21, the resistive layer 60, the semiconductor stage ST, and the conductive semiconductor layers 39 and 41.

Figure 7B:
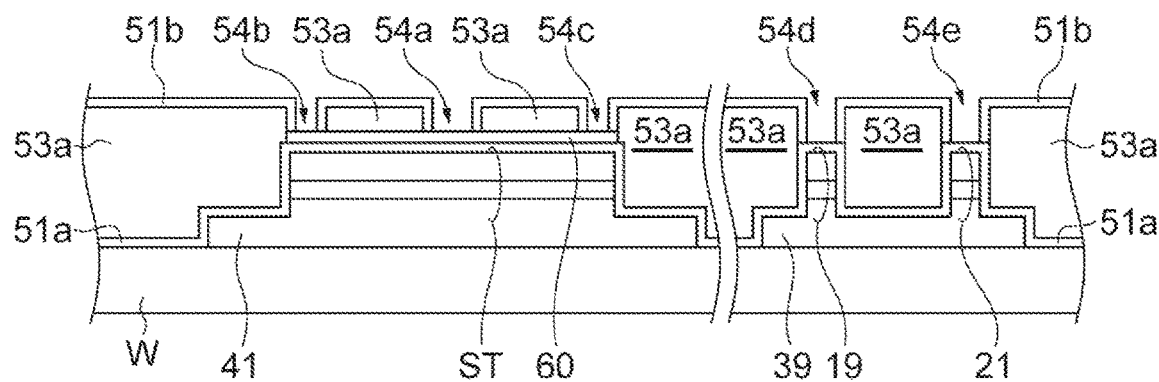
FIG. 7B is a schematic view showing a major step in the method according to the example of the embodiment.

Referring to FIG. 7B, the method includes a step for forming contact holes in resin body to fabricate the first embedding resin body 53a. Specifically, the application of photolithography and etching to the resin body forms, in the resin body, openings 54a, 54b and 54c to the resistive layer 60 (together with openings 54d and 54e to the first and second arm waveguide structures 19 and 21 of the Mach-Zehnder modulator), thereby providing the first embedding resin body 53a.

After the first embedding resin body 53a is provided with these openings, the second inorganic insulating film 51b is deposited on the wafer W to cover the entire top face of the first embedding resin body 53a. The second inorganic insulating film 51b covers the top face of the first embedding resin body 53a and the side and bottom faces of the openings 54a, 54b, 54c, 54d and 54e. The second inorganic insulating film 51b can include, for example, a silicon-based inorganic insulator, and is grown by, for example, a chemical vapor deposition.

Further, the application of photolithography and etching to the second inorganic insulating film 51b can remove the second inorganic insulating film 51b at the bottom of the openings of the first embedding resin body 53a, so that the resistive layer 60 appears at the openings 54a, 54b, 54c, 54d and 54e of the first embedding resin body 53a.

Figure 7C:
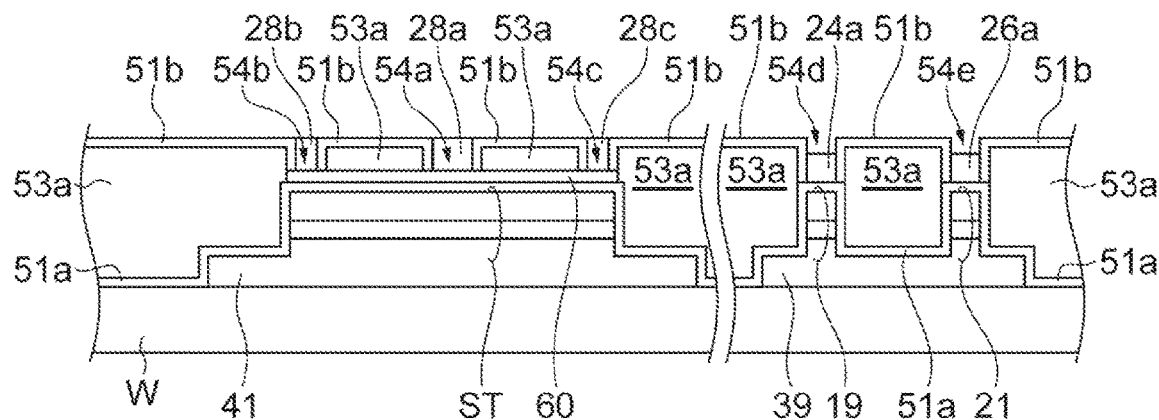
FIG. 7C is a schematic view showing a major step in the method according to the example of the embodiment.

Referring to FIG. 7C, the method includes a step for depositing metallic material on the wafer W to fabricate a lower metal film. The lower metal film (prepared for the metal layers 28a, 28b, 28c, 24a and 26a) are formed in the openings (respective openings 54a, 54b, 54c, 54d and 54e) of the first embedding resin body 53a.

Figure 8A:
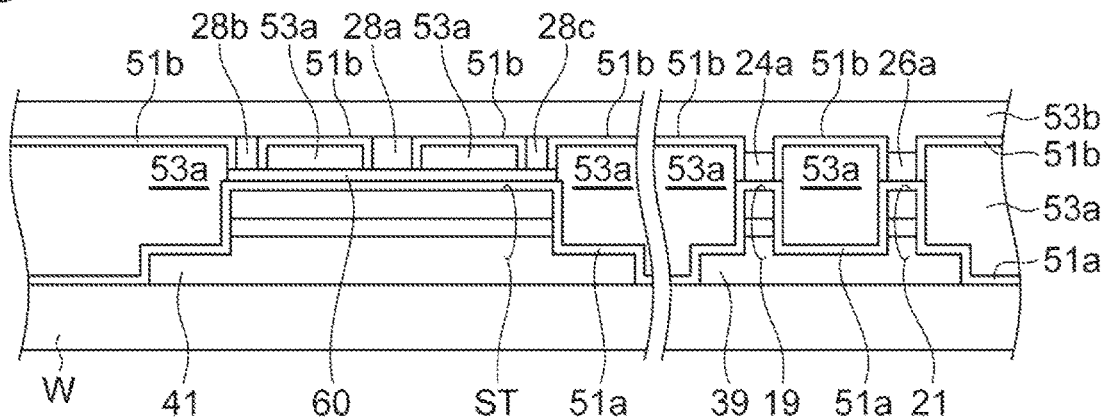
FIG. 8A is a schematic view showing a major step in the method according to the example of the embodiment.

Referring to FIG. 8A, the method includes a step for forming a resin body for the second embedding resin body 53b on the wafer W. Specifically, after the lower metal layers (28a, 28b, 28c, 24a and 26a) are produced from the lower metal film by patterning, the second embedding resin body 53b is formed on the wafer W. In order to form the second embedding resin body 53b, BCB resin is applied to the wafer W and the BCB resin thus applied is cured to form a cured resin body, which is hereinafter referred to as the resin body for the second embedding resin body 53b. The resin body for the second embedding resin body 53b embeds the lower metal layers (28a, 28b, 28c, 24a and 26a), the first embedding resin body 53a and the second inorganic insulating film 51b.

Figure 8B:
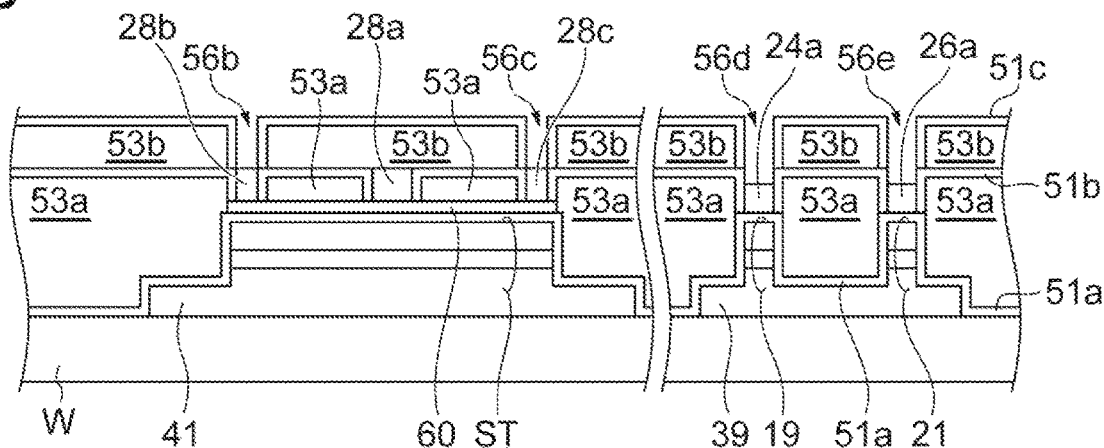
FIG. 8B is a schematic view showing a major step in the method according to the example of the embodiment.

Referring to FIG. 8B, the method includes a step for forming a contact hole in the resin body for the second embedding resin body 53b. Specifically, the application of photolithography and etching to the resin body for the second embedding resin body 53b can form openings (56b, 56c, 56d and 56e), which reach the lower metal layers (28b, 28c, 24a and 26a), respectively, in the resin body for the second embedding resin body 53b.

After the formation of the second embedding resin body 53b having these openings, the third inorganic insulating film 51c is deposited on the entire top face of the wafer W to cover the second embedding resin body 53b. The third inorganic insulating film 51c covers the top face of the second embedding resin body 53b and the side and bottom faces of the openings 56b, 56c, 56d and 56e. The third inorganic insulating film 51c includes, for example, a silicon-based inorganic insulator, and may be grown by, for example, a chemical vapor deposition.

The application of photolithography and etching to the third inorganic insulating film 51c removes the third inorganic insulating film 51c at the bottom of the openings (56b, 56c, 56d and 56e) of the second embedding resin body 53b, such that the lower metal layers (28b, 28c, 24a and 26a) appear at the openings (56b, 56c, 56d and 56e) of the second embedding resin body 53b, respectively.

Figure 8C:
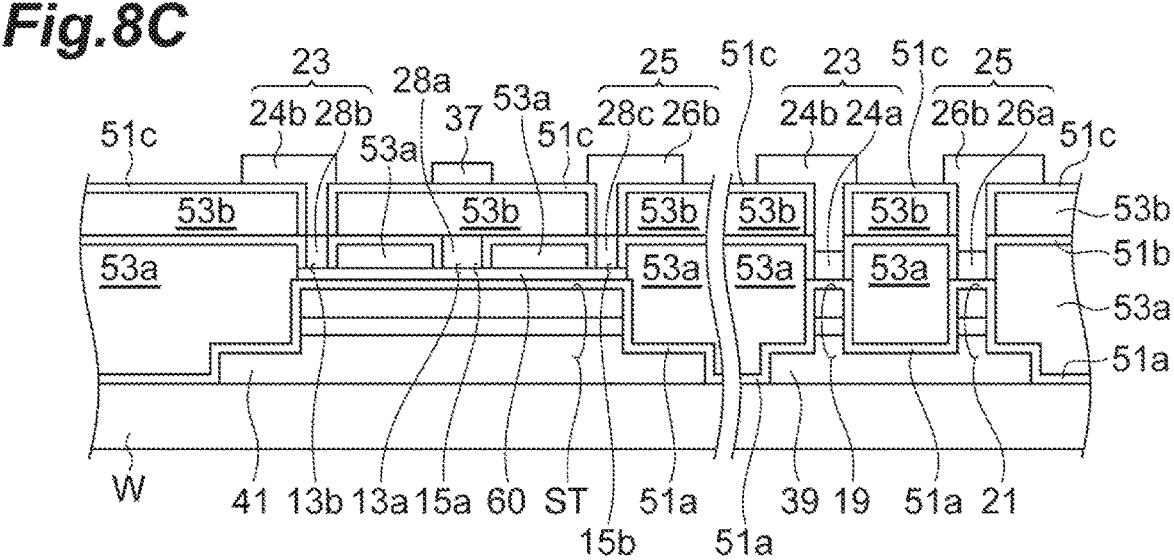
FIG. 8C is a schematic view showing a major step in the method according to the example of the embodiment.

Referring to FIG. 8C, the method includes a step for depositing a metal film for the first and second upper metal layers 24b and 26b. The application of photolithography and film deposition to the third inorganic insulating film 51c produces, from the metal film, a patterned metal film, which is hereinafter referred to as the first upper metal layer 24b and the second upper metal layer 26b, on the third inorganic insulating film 51c to fabricate the first and second signal conductors 23 and 25 and the reference potential conductor 37. Specifically, the metal film is deposited both on the third inorganic insulating film 51c and in the openings (54b and 54d, and 54c and 54e) of the first embedding resin body 53b and is patterned by lift-off.

These steps bring the Mach-Zehnder modulator 11 to completion.

The Mach-Zehnder modulator 11 uses a differential signal, propagating on the first and second signal conductors 23 and 25, to drive the first and second arm waveguide structures 19 and 21. The first and second signal conductors 23 and 25 are connected to the respective one ends of the first and second resistive elements 13 and 15, which work as a built-in terminator. The first and second resistive elements 13 and 15 are arranged in opposite directions so as to be connected to the common conductor 17 at the other ends thereof, thereby terminating the differential signal.

The Mach-Zehnder modulator 11 is provided with the conductive semiconductor layer 39, which is biased by an external power supply, connected with both the first and second arm waveguide structures 19 and 21.

In order to deliver the differential signal to the arm waveguides, the Mach-Zehnder modulator 11 may use a transmission line including the first and second signal conductors 23 and 25 and a reference potential conductor 37 therebetween. If necessary, the Mach-Zehnder modulator 11 may be provided with additional first and second additional reference potential conductors, which run outside the first and second signal conductors 23 and 25, to form the transmission line.

The above embodiment can provide a Mach-Zehnder modulator that can reduce signal reflection caused by the built-in termination resistive elements.

Having described and illustrated the principle of the invention in a preferred embodiment thereof, it is appreciated by those having skill in the art that the invention can be modified in arrangement and detail without departing from such principles. We therefore claim all modifications and variations coining within the spirit and scope of the following claims.

What is claimed is:

1. A Mach-Zehnder modulator comprising:
   a first resistive element having a first contact area and a second contact area, the first contact area and the second contact area of the first resistive element being arranged in a direction of a first axis;
   a second resistive element having a first contact area and a second contact area, the first contact area and the second contact area of the second resistive element being arranged in a direction of a second axis;
   a common conductor making direct contact with the first contact area of the first resistive element and the first contact area of the second resistive element to directly electrically connect the first resistive element and the second resistive element with each other;
   a first waveguide structure including a waveguide portion extending in a direction of a third axis intersecting the first axis and the second axis;
   a second waveguide structure including a waveguide portion extending in the direction of the third axis;
   a first signal conductor connected to the waveguide portion of the first waveguide structure and the second contact area of the first resistive element; and
   a second signal conductor connected to the waveguide portion of the second waveguide structure and the second contact area of the second resistive element.

2. The Mach-Zehnder modulator according to claim 1, further comprising a reference potential conductor extending along at least one of the first signal conductor and the second signal conductor.

3. The Mach-Zehnder modulator according to claim 2, wherein the common conductor and the reference potential conductor are arranged in a direction of an axis normal to a principal face of a substrate and run in parallel to form a transmission line.

4. The Mach-Zehnder modulator according to claim 3, further comprising a common mode terminator where the reference potential conductor is grounded.

5. The Mach-Zehnder modulator according to claim 1, further comprising;
   a semiconductor stage mounting the first resistive element and the second resistive element; and
   an embedding region embedding the first waveguide structure and the second waveguide structure, the first resistive element and the second resistive element being disposed in the embedding region.

6. The Mach-Zehnder modulator according to claim 1, further comprising a conductive semiconductor layer connecting the first waveguide structure and the second waveguide structure with each other.

7. The Mach-Zehnder modulator according to claim 1, wherein the common conductor comprises gold.

8. The Mach-Zehnder modulator according to claim 1, wherein a single resistive layer comprises the first and second resistive elements, the single resistive layer comprising a first portion, a second portion and a third portion between the first portion and the second portion, the third portion being connected to the common conductor.

9. The Mach-Zehnder modulator according to claim 1, wherein the first and second resistive elements comprise first and second resistive layers respectively, each of the first and second resistive layers including a portion electrically connected to the common conductor comprising metal.

* * * * *